United States Patent [19]

Pletscher

[11] Patent Number: 4,655,472
[45] Date of Patent: Apr. 7, 1987

[54] SUPPORT OR KICK STAND FOR TWO-WHEELED VEHICLE

[75] Inventor: Oskar Pletscher, Marthalen, Switzerland

[73] Assignee: Gebrüder Pletscher, Marthalen, Switzerland

[21] Appl. No.: 577,538

[22] Filed: Feb. 6, 1984

[30] Foreign Application Priority Data

Feb. 15, 1983 [CH] Switzerland ............................. 835/83

[51] Int. Cl.[4] ................................................ B62H 1/02
[52] U.S. Cl. ....................................... 280/303; 248/169
[58] Field of Search ................ 280/293, 295, 301, 303; 248/168, 169; 180/219

[56] References Cited

U.S. PATENT DOCUMENTS

| 2,587,790 | 3/1952 | Thalman | 280/301 |
| 3,376,049 | 4/1968 | Gordon | 280/301 |

FOREIGN PATENT DOCUMENTS

| 2293353 | 7/1976 | France | 280/303 |
| 104790 | 6/1942 | Sweden | 280/293 |
| 110701 | 5/1944 | Sweden | 280/303 |
| 390094 | 3/1933 | United Kingdom | 280/303 |

Primary Examiner—John J. Love
Assistant Examiner—Everett G. Diederiks, Jr.
Attorney, Agent, or Firm—Werner W. Kleeman

[57] ABSTRACT

Two support legs mutually coupled to have a common pivoting motion between a supporting position and a rest or idle position are mounted in a pivot block or head mountable behind the drive sprocket bearing of a two-wheeled vehicle, such as a bicycle or moped. In the rest or idle position, both support legs are substantially horizontal and in the supporting position both support legs are substantially upright and spread apart from one another. In order to reduce the construction height of the pivot block or head and not diminish the ground clearance of the two-wheeled vehicle, both support legs are arranged on the side of the vehicle opposite the drive sprocket when they are in the rest or idle position. An arrangement is provided to force one support leg away from the other support leg as both support legs are pivoted into the supporting position.

13 Claims, 9 Drawing Figures

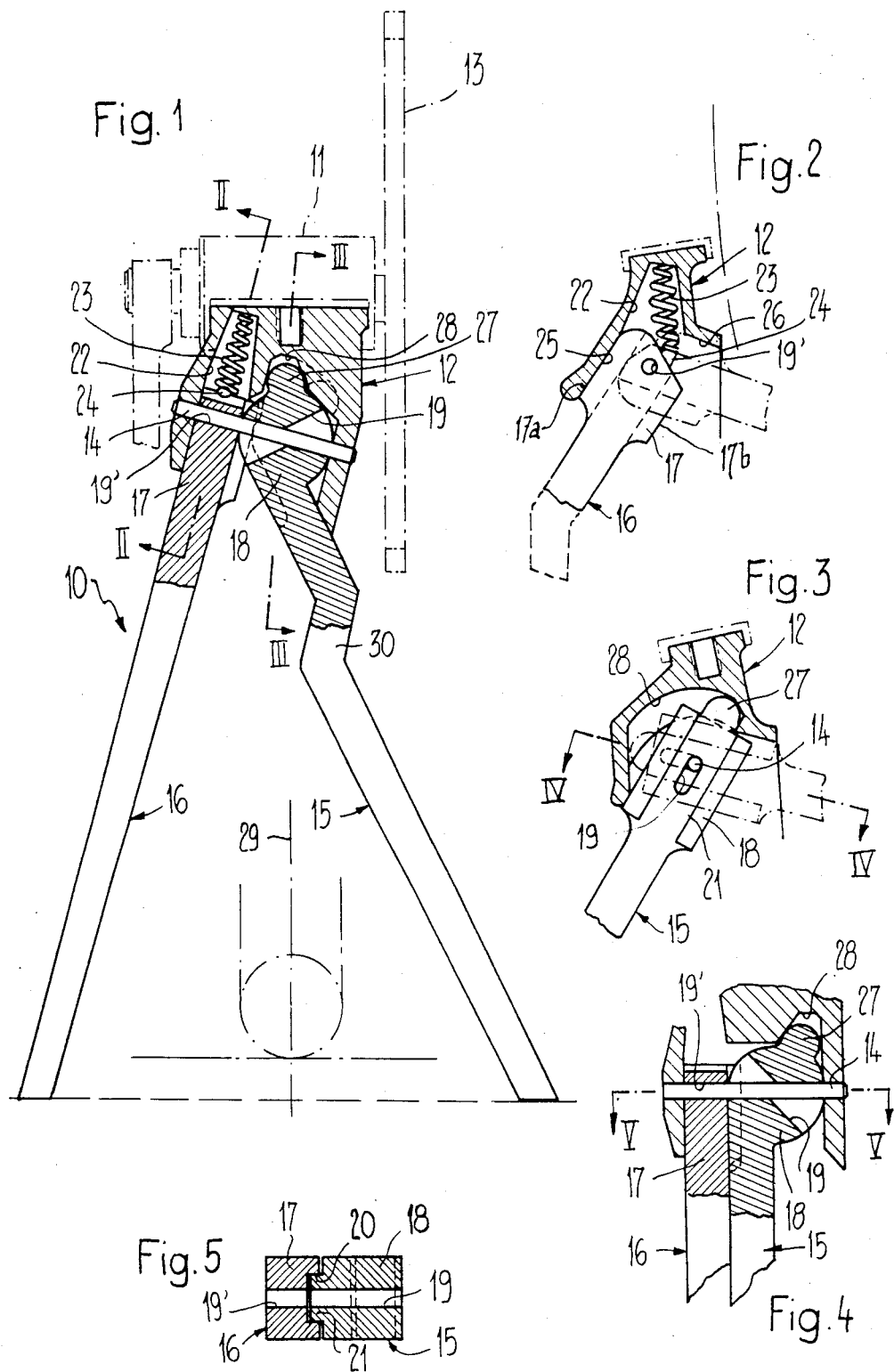

SUPPORT OR KICK STAND FOR TWO-WHEELED VEHICLE

BACKGROUND OF THE INVENTION

The present invention broadly relates to support means for two-wheeled vehicles and, more specifically, pertains to a new and improved construction of a supporting stand or kick stand for a bicycle or a moped or the like.

Generally speaking, the support or kick stand of the present invention is of the type mounted at the two-wheeled vehicle, usually in the vicinity of and typically behind the drive sprocket bearing. This support or kick stand has two support legs capable of being pivoted downward and locked into a substantially upright supporting position for supporting the two-wheeled vehicle stably in an essentially upright position and preventing it from tipping over or rolling away. When the two-wheeled vehicle is in operation, the support legs of the support or kick stand can be pivoted upward to assume a compact rest or idle position defining a storage position where such support legs do not interfere with the operation of the vehicle.

In its more particular aspects the inventive support or kick stand for a two-wheeled vehicle is of the type comprising a pivot block or head intended to be mounted behind the drive sprocket bearing of the vehicle. In such pivot block or head there are pivotably mounted two support legs or leg members operatively coupled with one another to perform a common or conjoint pivotal motion. These two support legs are moveable between a spring-loaded rest or idle position where the support legs bear against one another while essentially in a horizontal position, and a spring-loaded support position where the support legs are essentially upright and spread from one another. One of the support legs is mounted upon a pivot shaft or axle. Furthermore, in the part of its pivoting motion preceding the support position of this one support leg, the other support leg can be brought into a spread position by means of a path-dependently effective spreading device.

In comparison with the so-called single-legged support stands or kick stands generally only used for bicycles, two-legged support stands of the aforementioned type have the advantage that they support the bicycle or moped or the like with its central plane in a substantially vertical position and usually lift one of the wheels of the bicycle slightly off the ground. One-legged bicycle support stands are not always able to provide the supported bicycle or moped with a sufficient degree of stability in the parked position, especially on sloping ground or terrain.

A bicycle stand of the general type heretofore discussed is known from the French Patent Publication No. 2,293,353, filed Dec. 3, 1974, especially FIGS. 4 to 6 thereof. This support stand overcomes the aforementioned disadvantages of single-legged bicycle stands, but only by accepting other disadvantages. In this known two-legged support stand the spreading or opening action between the two legs of the support stand is effected by the mutual interaction of two springs during the pivoting motion of the support legs out of the rest or idle position. The springs act upon parts of their respectively associated support legs lying between the pivot axis and the free end thereof. In these known support stands, one of the springs is structured as a tension spring and is accessible from the outside and therefore subject to dirt and damage. The second support leg, which spreads away from the first support leg, is mounted on a separate pivot shaft fixed to the first support leg and substantially perpendicular to but not intersecting the pivot axis. An extension of this second support leg carries a knob or cam boss which engages and cooperates with a guide or cam groove provided at the outside of the housing of the pivot bearing. A spreading spring is coiled about the axis of the second, spreadable support leg and tends to force or spread this support leg away from the other, non-spreading support leg, i.e. tends to maintain the aforementioned knob or cam boss in constant contact with the guide or cam groove. As the legs of the support stand are pivoted out of their rest or idle position into the supporting position the spreading or bracing support leg will follow, respectively deviate from, the motion of the first, non-spreading support leg as dictated by the configuration of the guide or cam groove. If the spreading spring weakens or becomes fatigued then the spreading action is no longer assured. The knob or cam boss and the guide or cam groove are also accessible from the outside in this known support stand and are therefore also subject to dirt or fouling and damage.

SUMMARY OF THE INVENTION

Therefore, with the foregoing in mind it is a primary object of the present invention to provide a new and improved construction of a two-legged vehicle support stand which does not have associated with it the aforementioned drawbacks and shortcomings of the prior art constructions.

Another and more specific object of the present invention aims at providing a new and improved construction of a bicycle or moped support or kick stand of the previously mentioned type in which the entire mechanism for spreading the legs of the support or kick stand is integrated into the pivot block or head and therefore largely protected against dirt and damage.

A further important object of the present invention is to provide positive mean of effecting the spreading action of one of the kick stand legs away from the other leg thereof independently of any mutual interaction of two springs.

Yet a further significant object of the present invention aims at providing a new and improved construction of a bicycle or moped stand of the character described which is relatively simple in construction and design, extremely economical to manufacture, highly reliable in operation, not readily subject to breakdown or malfunction and requires a minimum of maintenance and servicing.

Now in order to implement these and still further objects of the present invention, which will become more readily apparent as the description proceeds, the support or kick stand of the present development is manifested by the features that the other support leg is swivelably or tiltably supported at the pivot shaft in a plane extending through or containing such pivot shaft and contains a projection or extension operatively coupled with the spreading device.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 schematically shows a substantially vertical cross-section substantially parallel to the axis of a drive sprocket bearing, through a first embodiment of the support or kick stand of the invention in its operative or support position;

FIG. 2 is a schematic longitudinal section taken substantially along the line II—II of FIG. 1;

FIG. 3 is a schematic longitudinal section taken substantially along the line III—III of FIG. 1;

FIG. 4 is a schematic horizontal section taken substantially along the line IV—IV of FIG. 3 and showing the support legs or leg members in their idle or rest position;

FIG. 5 schematically shows a cross-section taken substantially along the line V—V of FIG. 4 and omitting the pivot block or head structure of the support or kick stand;

DETAILED DESCRIPTION OF THE PREFERRED EMBODIMENTS

Figure 6:
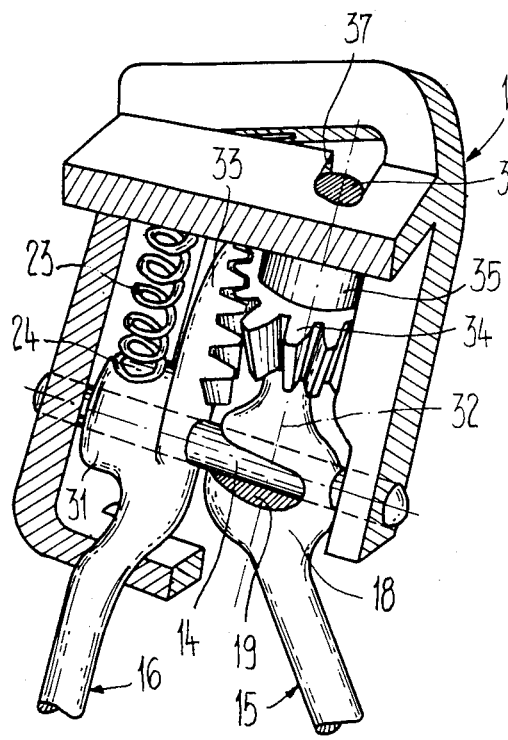
FIG. 6 is a schematic phantom perspective view of a second embodiment of the invention showing the support or kick stand in its operative or support position.
Figure 7:
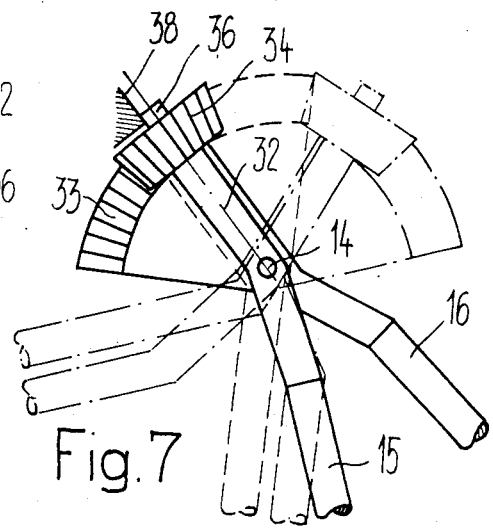
FIGS. 7 through 9 are respective schematic side views showing the sequence of operation of the embodiment of FIG. 6 as the support or kick stand is pivoted up from its operative or support position, as shown in FIG. 7, to its idle or rest position as shown in FIG. 9.

Describing now the drawings, the two-wheeled vehicle support or kick stand, such as the exemplarily depicted bicycle or moped support or kick stand 10 shown in FIG. 1, comprises a pivot head or block structure 12 mounted behind the drive sprocket bearing housing 11 (shown in broken or phantom lines in FIG. 1) of a bicycle or moped and beneath the lower rear frame members thereof (both not shown in the drawings) for supporting the rear vehicle wheel. A pivot shaft or axle 14 is fixed in this pivot head or block structure 12 with its central axis sloping upward away from the drive sprocket side 13 of the vehicle. Two support legs or leg members 15, 16 of the support stand 10 are pivotably mounted on this pivot shaft 14. Both support legs 15, 16 are provided with pivot heads or journals 17, 18 which are penetrated by the pivot shaft or axle 14.

The pivot shaft 14 penetrates the pivot journal 17 of the first support leg 16 in a substantially cylindrical bore 19'. This pivot shaft 14 penetrates the pivot journal 18 of the second support leg 15 in a bore or aperture 19 having a substantially X-shaped configuration in longitudinal section, as best can be seen in FIGS. 1 and 4. The cross-section of the bore 19 is circular at its narrowest point or throat and becomes increasingly oval i.e. its area increases at increasing distances from this narrowest point as indicated for instance in FIG. 3. A groove or slot 20 is provided in the pivot journal 17 and such runs transverse to the pivot shaft 14. A partially arcuate tongue or spring 21 is provided on the pivot journal 18 to engage the groove 20, as can be seen in FIG. 5. The support legs 15, 16 are therefore provided with integral means mutually coupling them with respect to their pivoting motion, so that as one support leg·is pivoted about the pivot shaft 14, the other support leg is forced to pivot with it.

A compression or pressure spring 23 is seated at its upper end in the upper portion of a cavity or recess 22 formed in the top of the pivot head structure 12 and opening conically outward and downward toward the pivot journal or head 17. The other end of this compression spring 23 is seated on the pivot journal or head 17 so as to surround a knob or boss 24 formed thereat. It will be evident from FIG. 2 that the knob or boss 24 is situated on on side of the pivot shaft 14 when the support leg 16 is in its operative or supporting position (shown in solid lines in FIG. 2) and on the other side thereof when the support leg 16 is in its idle or rest position (shown in broken lines in FIG. 2). Two contact faces or stop surfaces 25 and 26 are formed on the interior of the pivot head or block structure 12 to cooperate with corresponding contact faces or stop surfaces 17a and 17b formed on the pivot journal or head 17 of the support leg 16. The cooperation of the compression spring 23 with the seating knob or boss 24, on the one hand, and the cooperation of the contact faces or stop surfaces 25, 26 with the associated contact faces or stop surfaces 17a, 17b formed on the pivot journal or head 17, on the other hand, serve to provide the support leg 16 and with it the support leg 15 with two stable end or terminal positions constituting the aforementioned idle or rest position and operative or supporting position.

Due to the special longitudinal profile of the bore 19 already described, the support leg or leg member 15 is not only pivotable about the pivot shaft 14 but can also swivel or tilt about an abstract or virtual axis intersecting the pivot shaft 14 substantially perpendicularly at the location of the narrowest part of the bore. This swivelling or tilting motion about this virtual axis provides the support leg 15 with an additional motion away from and toward the other support leg 16.

In order that this supplementary swiveling motion take place under controlled circumstances, a substantially hemispherical extension or guide knob 27, defining a follower element, is formed on the pivot journal or head 18 so as to engage a guide groove or slot 28, defining a cam, formed on the interior of the pivot head structure 12. The guide groove or slot 28 has an essentially L-shaped configuration with an obtuse angle between the two legs of the L defined by the regions of such guide groove or slot. One of these regions of the guide groove or slot 28 begins at the forward end of the pivot head structure 12 relative to the direction of travel of the vehicle and extends in a plane substantially perpendicular to the pivot shaft 14 at a distance from the support leg 16. The other region of the guide groove or slot 28 is a continuation of the first region and progressively approaches the support leg 16. The start of the first region or leg of the guide groove or slot 28 can be seen in FIG. 4, while the end of the other, continuing or merging region or leg can be seen in FIG. 1.

The construction described above operates in the following manner: in the idle or rest position when the support legs 15, 16 are pivoted up to a substantially horizontal position, they extend practically parallel and in mutual contact along the side of the vehicle opposite the drive sprocket or sprocket wheel 13. When the support legs 15, 16 are pivoted down into their substantially upright position, they at first move parallel to one another as long as the guide knob or follower 27 is engaging that region of the guide groove or cam 28 which extends in a plane perpendicular to the pivot shaft 14. As soon as a further pivoting motion causes the guide knob or follower 27 to enter the region of the guide groove or cam 28 which approaches the other support leg 16, the support leg 15 performs, in addition to the pivoting motion, a spreading or swiveling motion away from the support leg 16 until the position represented in FIG. 1 is reached.

The angle through which the support leg 15 swivels away from the other support leg 16 is determined by the path or course of that region of the guide groove 28 which approaches the other support leg 16 as well as by the opening angle of the X-shaped longitudinal profile of the bore 19 in the pivot journal or head 18. The slope of the axis of the pivot shaft 14, on the one hand, and the angle of spread between the two support legs 15, 16, on the other hand, is advantageously chosen to position the bearing surface of the support leg 16 and that of the support leg 15 in the support position on the ground at approximately equal lateral distances from the longitudinal center plane of the vehicle indicated by the broken line 29 in FIG. 1. In the supporting position the bearing surfaces of the support legs 15, 16 are spaced about 20 to 30 centimeters apart according to the wheel diameter of the vehicle.

The bend or step 30 of the support leg or leg member 15 serves two purposes. It permits a larger choice of diameters for the drive sprocket 13 without interfering with the lower run of the chain in the support position, as can be seen in FIG. 1. It also has the effect that only the portions of the support legs or leg members 15, 16 in the proximity of the pivot journals or heads 17, 18 are laterally adjacent in the upwardly pivoted idle or rest position, while the remaining portions extending to the free ends of the support legs are disposed vertically adjacent or in superimposed relationship, thus reducing lateral space requirements for the stored bicycle support or kick stand.

In the embodiment shown in FIGS. 1 through 5 the swiveling or spreading motion of the support leg 15 relative to a substantially vertical plane of the support stand which coincides with the longitudinal central plane of the vehicle is effected by cooperation of the guide knob 27 with the guide groove 28. It is also possible to couple the two pivot journals or heads 17, 18 of the support legs 15, 16 by means of respective toothed sectors of bevel gears or the like and by a corresponding arrangement of guides and stops to inhibit a mutual rolling of the gear segments upon one another at the start of the downward pivoting of the support legs and to subsequently force them to roll upon one another. An embodiment of this type is schematically shown in FIGS. 6 through 9.

It will be seen in FIG. 6 that the two support legs or leg members 15, 16 (of which only the upper region is shown in the drawing) are pivotably mounted on the pivot shaft or axle 14. For reasons of clarity, the pivot head or block structure 12 is represented as an open framework in FIG. 6. The compression spring 23 is seated at one end on the knob 24 which, in this embodiment, is formed on a hub or journal head 31 of the support leg 16 and penetrated by the pivot shaft 14. The pivot journal or head 18 of the support leg 15 is also penetrated by this pivot shaft 14. In this embodiment, the opening 19 in this pivot journal or head 18 does not have an X-shaped longitudinal profile, rather a substantially V-shaped longitudinal profile in which the narrowest region or throat is located to the right in FIG. 6. This narrowest region of the opening 19 has a substantially circular section and increasingly remote regions have substantially oval sections of increasing area or lengthwise extent. The length of the oval becomes sufficiently great in that part of the pivot journal or head 18 oriented to the left in FIG. 6 that the opening 19 has the appearance of a longitudinal slot on the periphery of the pivot journal or head 18. This geometry of the opening 19 permits the support leg 15 not only to pivot about the pivot shaft 14 but also to swivel or tilt about an axis 32 substantially perpendicular thereto.

The hub or journal head 31 is provided with an integrally formed bevel gear segment 33 meshing or engaging with a further bevel gear segment 34 mounted on an extension of the pivot journal or head 18 of the support leg 15 and fixed against rotation thereupon. This bevel gear segment 34 is provided with an integral hub or body 35 carrying an integral pin or pin member 36. In the operative or support position of the support or kick stand the pin 36 engages a limit stop 38 formed at the end of an elongated slot 37 open at one end.

Figure 8:
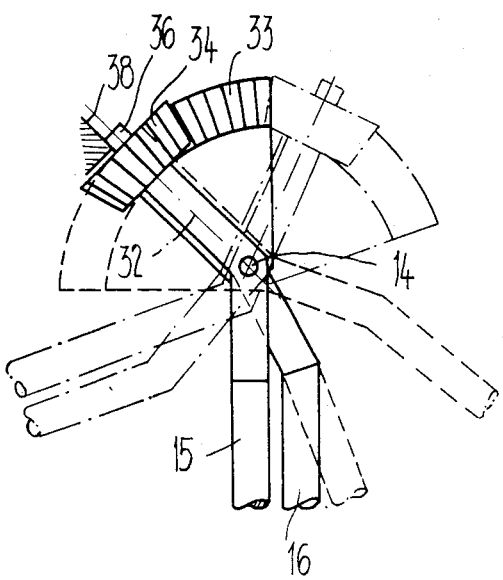

The arrangement described above and shown purely schematically in FIGS. 7 through 9 operates in the following manner: when the support leg or leg member 16 is pivoted from the operative or support position toward the idle or rest position, i.e. toward the observer as seen in FIG. 6 and in a clockwise direction as seen in FIG. 7, the bevel gear segment 33 at first forces the bevel gear segment 34 to rotate. The support leg 15 is thereby swivelled out of its spread or angled position until the end of the opening 19 visible in FIG. 6 engages the pivot shaft 14 as a stop. The two bevel gear segments 33, 34 can no longer roll upon one another. This position, in which the support leg 15 lies adjacent to the support leg 16, is shown in FIG. 8.

Figure 9:
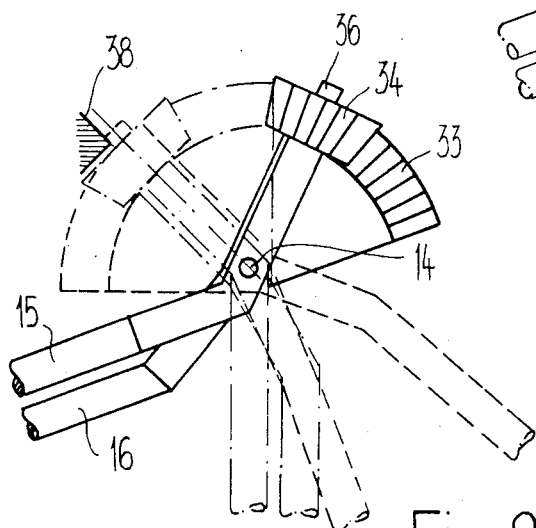

The further pivoting motion toward the idle or rest position, defining a storage position, is common to both support legs 15 and 16, i.e. with no relative motion between them. This phase of operation is shown in FIGS. 8 and 9.

It will be understood that the mechanism shown in FIG. 6 is completely surrounded by the pivot head or block structure 12 which has essentially the shape of a cap or housing and is illustrated in FIG. 6 as an open framework for reasons of representational clarity only.

While there are shown and described present preferred embodiments of the invention, it is to be distinctly understood that the invention is not limited thereto, but may be otherwise variously embodied and practiced within the scope of the following claims.

Accordingly, what I claim is:

1. A support stand for a two-wheeled vehicle, comprising:
   pivot head means mounted on the vehicle;
   two support leg members pivotably mounted in said pivot head means;
   said two support leg members being operatively couple with one another so as to perform conjoint pivoting motion;
   said two support leg members being movable between a spring-loaded rest position where said two support leg members bear against one another while essentially in a horizontal position and a spring-loaded vehicle support position where said two support leg members are essentially in an upright position and spread apart from one another;
   a pivot shaft upon which there is pivotably mounted one of said two support leg members;
   a path-dependently effective spreading device for bringing the other support leg member into a spread position during a part of its pivoting motion preceding said vehicle support position of said one support leg member;

said other support leg member being swivelably supported at said pivot shaft for performing a swivel motion in a plane extending substantially through said pivot shaft; and said other support leg member being provided with an extension operatively coupled with said spreading device.

2. The support stand as defined in claim 1, wherein:

said spreading device comprises cam means and a cam follower element defined by said extension; and said cam means and cam follower element being displaceable relative to one another.

3. The support stand as defined in claim 1, wherein:

said other leg member is provided with a pivot head at the region of said pivot shaft;

said pivot head being provided with a bore through which piercingly extends said pivot shaft; and said bore having a substantially X-shaped longitudinal profile possessing a substantially circular cross-sectional configuration at a throat portion of said bore and possessing to both sides of said throat portion a substantially oval cross-section of increasing lengthwise extent.

4. The support stand as defined in claim 2, wherein:

said other leg member is provided with a pivot head at the region of said pivot shaft;

said pivot head being provided with a bore through which piercingly extends said pivot shaft;

said bore having a substantially X-shaped longitudinal profile possessing a substantially circular cross-sectional configuration at a throat portion of said bore and possessing to both sides of said throat portion a substantially oval cross-section of increasing lengthwise extent;

said cam follower element being provided at said pivot head of the other support leg member; and said cam means being provided internally of said pivot head means.

5. The support stand as defined in claim 1, wherein:

said spreading device comprises a segment of a bevel gear provided at said extension of the other support leg member;

tooth segment means provided for the one support leg member; and said segment of said bevel gear continuously meshing with said tooth segment means.

6. A support stand for a two-wheeled vehicle having a central vertical plane and provided with a drive sprocket on a predetermined side of the central vertical plane comprising:

a pivot heat structure mounted substantially behind a drive sprocket bearing housing of said vehicle;

first and second support legs having a common, spring-loaded, substantially horizontal idle position and a common, spring-loaded, substantially vertical operative position;

pivot means fixed in said pivot head structure to define a common pivot axis for said first and second support legs;

said first and second support legs assuming a mutually immediately adjacent relationship in said idle position and a mutually spread relationship in said operative position;

the support stand defining a substantially vertical plane when in said operative position substantially coinciding with the central vertical plane of the two-wheeled vehicle;

said substantially vertical plane having a predetermined side corresponding to the predetermined side of the central vertical plane of the two-wheeled vehicle at which the drive sprocket is provided;

said first and second support legs both extending commonly in said idle position on a single side of the two-wheeled vehicle and of said substantially vertical plane opposite said predetermined side of said central vertical plane;

said first support leg being mounted on said pivot means to perform a pivoting motion about said common pivot axis between the idle position and the operative position;

said pivoting motion having a predetermined course preceding attainment of the operative position;

means for mutually coupling said first and second support legs to constrain them to conjointly perform said pivoting motion;

said second support leg being capable of performing a swiveling motion away from said first support leg into said mutually spread relationship therewith;

control means provided in the pivot head structure for causing said second support leg to follow said first support leg in said mutually immediately adjacent relationship during an initial portion of said predetermined course of the pivoting motion and for inducing said swiveling motion of the second support leg away from said first support leg during a subsequent portion of said predetermined course of the pivoting motion in operative dependence thereon;

the second support leg being supported on the pivot means to perform the swiveling motion substantially within a plane passing through the common pivot axis thereof; and the second support leg being provided with an extension member arranged within the pivot head and engaging said control means.

7. A support stand for a two-wheeled vehicle having a central vertical plane and provided with a drive sprocket on a predetermined side of the central vertical plane comprising:

a pivot head structure mounted substantially behind a drive sprocket bearing housing of said vehicle;

first and second support legs having a common, spring-loaded, substantially horizontal idle position and a common, spring-loaded, substantially vertical operative position;

pivot means fixed in said pivot head structure to define a common pivot axis for said first and second support legs;

said first and second support legs assuming a mutually adjacent relationship in said idle position and a mutually spread relationship in said operative position;

the support stand defining a substantially vertical plane when in said operative position substantially coinciding with the central vertical plane of the two-wheeled vehicle;

said substantially vertical plane having a predetermined side corresponding to the predetermined side of the central vertical plane of the two-wheeled vehicle at which the drive sprocket is provided;

said first and second support legs both extending commonly in said idle position on single side of the two-wheeled vehicle and of said substantially vertical plane opposite said predetermined side of said central vertical plane;

said first support leg being mounted on said pivot means to perform a pivoting motion about said pivot axis between the idle position and the operative position;

said pivoting motion having a predetermined course preceding attainment of the operative position;

means for mutually coupling said first and second support legs to constrain them to conjointly perform said pivoting motion;

said second support leg being capable of performing a swiveling motion away from said first support leg into said mutually spread relationship therewith;

control means provided in the pivot head structure for causing said second support leg to follow said first support leg in said mutually immediately adjacent relationship during an initial portion of said predetermined course of the pivoting motion and for inducing said swiveling motion of the second support leg away from said first support leg during a subsequent portion of said predetermined course of the pivoting motion in operative dependence thereon;

the second support leg being supported on the pivot means to perform the swiveling motion substantially within a plane passing through the pivot axis thereof;

the second support leg being provided with an extension member engaging said control means; and said control means comprising a guide groove and a cam follower knob capable of mutual relative motion.

8. The support stand as defined in claim 7, wherein:

said cam follower knob is integrally formed on said pivot head; and said guide groove being formed on an interior surface of said pivot head means.

9. A support stand for a two-wheeled vehicle comprising;

a pivot head structure mounted substantially behind a drive sprocket bearing housing of said vehicle;

first and second support legs having a common, spring-loaded, substantially horizontal idle position and a common, spring-loaded substantially vertical operative position;

pivot means fixed in said pivot head structure to define a pivot axis for said first and second support legs;

said first and second support legs assuming a mutually adjacent relationship in said idle position and mutually spread relationship in said operative position;

said first support leg being mounted on said pivot means to perform a pivoting motion about said pivot axis between the idle position and the operative position;

said pivoting motion having a predetermined course preceding attainment of the operative position;

means for mutually coupling said first and second support legs to constrain them to conjointly perform said pivoting motion;

said second support leg being capable of performing a swiveling motion away from said first support leg into said mutually spread relationship therewith;

control means provided in the pivot head structure to induce said swiveling motion of the second support leg during said predetermined course of the pivoting motion in operative dependence thereon;

the second support leg being supported on the pivot means to perform the swiveling motion substantially within a plane passing through the pivot axis thereof;

the second support leg being porvided with an extension member engaging said control means;

said second supporting leg being provided with a pivot head in the region of said pivot means;

said pivot head being penetrated by a non-uniform bore for accommodating the pivot means; and said bore having a substantially oval cross-section at its two ends decreasing in area towards an intermediate throat region of substantially circular cross-section.

10. A support stand for a two-wheeled vehicle comprising;

a pivot head structure mounted substantially behind a drive sprocket bearing housing of said vehicle;

first and second support legs having a common, spring-loaded, substantially horizontal idle position and a common, spring-loaded, substantially vertical operative position;

pivot means fixed in said pivot head structure to define a common pivot axis for said first and second support legs;

said first and second support legs assuming a mutually adjacent relationship in said idle position and a mutually spread relationship in said operative position;

said first support leg being mounted on said pivot means to perform a pivoting motion about said pivot axis between the idle position and the operative position;

said pivoting motion having a predetermined course preceding attainment of the operative position;

means for mutually coupling said first and second support legs to constrain them to conjointly perform said pivoting motion;

said second support leg being capable of performing a swiveling motion away from said first support leg into said mutually spread relationship therewith;

control means provided in the pivot head structure to induce said swiveling motion of the second support leg during said predetermined course of the pivoting motion in operative dependence thereon;

the second support leg being supported on the pivot means to perform the swiveling motion substantially within a plane passing through the pivot axis thereof;

the second support leg being provided with an extension member engaging said control means;

said control means comprising a bevel gear segment integrally formed on said extension member of said second support leg;

a gear segment integrally formed on said first support leg; and said bevel gear segment being in constant mesh with said gear segment.

11. A support stand for a two-wheeled vehicle provided with a drive sprocket comprising;

a pivot head structure mounted substantially behind a drive sprocket bearing housing of said vehicle;

first and second support legs having a common, spring-loaded, substantially horizontal idle position and a common, spring-loaded, substantially vertical operative position;

pivot means fixed in said pivot head structure to define a common pivot axis for said first and second support legs;

said first and second support legs assuming a mutually immediately adjacent relationship in said idle position and a mutually spread relationship in said operative position;

said first and second support legs both extending commonly in said idle position on a single side of the two-wheeled vehicle opposite a side of the two-wheeled vehicle provided with said drive sprocket;

said first support leg being mounted on said pivot means to perform a pivoting motion about said common pivot axis between the idle position and the operative position;

said pivoting motion having a predetermined course preceding attainment of the operative position;

means for mutually coupling said first and second support legs to constrain them to conjointly perform said pivoting motion;

said second support leg being capable of performing a swiveling motion away from said first support leg into said mutually spread relationship therewith;

control means provided in the pivot head structure to induce said swiveling motion of the second support leg during said predetermined course of the pivoting motion in operative dependence thereon;

the second support leg being supported on the pivot means to perform the swiveling motion substantially within a plane passing through the common pivot axis thereof;

the second support leg being provided with an extension member arranged within the pivot head and engaging said control means;

the two-wheeled vehicle having a central vertical plane; and the first and second support legs extending on a common side of said central plane when in said substantially horizontal idle position.

12. The support stand as defined in claim 11, wherein:

the two-wheeled vehicle has a drive sprocket situated on a first side of said central vertical plane; and said single side upon which said first and second support legs extend defining a second side of said central plane opposite to said first side.

13. A support stand for a two-wheeled vehicle having a central vertical plane comprising:

a pivot head structure mounted substantially behind a drive sprocket bearing housing of said vehicle;

first and second support legs having a common, spring-loaded, substantially horizontal idle position and a common, spring-loaded, substantially vertical operative position, therein defining a substantially vertical plane substantially coinciding with the central vertical plane of the two-wheeled vehicle;

pivot means fixed in said pivot head structure to define a common pivot axis;

said first and second support legs assuming a mutually immediately adjacent relationship on a single side of the two-wheeled vehicle and of said substantially vertical plane in said idle position and a mutually spread relationship extending on both sides of the two-wheeled vehicle and of said substantially vertical plane in said operative position;

said first support leg being mounted on said pivot means to perform a pivoting motion about said common pivot axis between the idle position and the operative position;

said pivoting motion having a predetermined course preceding attainment of the operative position;

means for mutually coupling said first and second support legs to constrain them to conjointly perform said pivoting motion;

means defining a swivel axis extending substantially perpendicular to the common pivot axis;

said second support leg being capable of performing a swiveling motion about said swivel axis and away from said first support leg into said mutually spread relationship therewith while performing said conjoint pivoting motion;

control means provided in the pivot head structure to induce said swiveling motion of the second support leg in relation to the first support leg during said predetermined course of the pivoting motion in operative dependence thereon;

the second support leg being supported on the pivot means to perform the swiveling motion substantially within a plane passing through the common pivot axis thereof; and the second support leg being provided with an extension member arranged within the pivot head and engaging said control means.

* * * * *

UNITED STATES PATENT AND TRADEMARK OFFICE
CERTIFICATE OF CORRECTION

PATENT NO. : 4,655,472
DATED : April 7, 1987
INVENTOR(S) : OSKAR PLETSCHER

It is certified that error appears in the above-identified patent and that said Letters Patent is hereby corrected as shown below:

Column 2, line 43 please delete "mean" and insert --means

Column 6, line 53, at the beginning of the line delete "ple" and insert --pled--

Column 7, line 52, delete "heat" and insert --head--

Column 9, line 51, after "position and" insert --a--

Column 11, line 41, at the beginning of the line delete "the" and insert --said--

Signed and Sealed this

Eleventh Day of August, 1987

*Attest:*

DONALD J. QUIGG

*Attesting Officer*   *Commissioner of Patents and Trademarks*